United States Patent
Kanno et al.

(10) Patent No.: US 12,500,265 B2
(45) Date of Patent: Dec. 16, 2025

(54) SULFIDE SOLID ELECTROLYTE, ALL SOLID STATE BATTERY, AND METHOD FOR PRODUCING SULFIDE SOLID ELECTROLYTE

(71) Applicants: TOKYO INSTITUTE OF TECHNOLOGY, Tokyo-to (JP); TOYOTA JIDOSHA KABUSHIKI KAISHA, Toyota (JP)

(72) Inventors: Ryoji Kanno, Tokyo-to (JP); Satoshi Hori, Tokyo-to (JP); Keiichi Minami, Tagata-gun (JP); Shinya Shiotani, Nagoya (JP)

(73) Assignees: TOKYO INSTITUTE OF TECHNOLOGY, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 678 days.

(21) Appl. No.: 17/958,785

(22) Filed: Oct. 3, 2022

(65) Prior Publication Data

US 2023/0253613 A1  Aug. 10, 2023

(30) Foreign Application Priority Data

Oct. 7, 2021 (JP) .................. 2021-165304

(51) Int. Cl.
*H01M 10/0562* (2010.01)

(52) U.S. Cl.
CPC ............. *H01M 10/0562* (2013.01); *H01M 2300/0068* (2013.01)

(58) Field of Classification Search
CPC ........... H01M 10/0562; H01M 10/052; H01M 2300/0068; H01M 4/62; H01M 4/664; H01M 6/18; H01M 6/188; C04B 2235/3203; C04B 2235/3287; C04B 2235/36; C04B 2235/444; C04B 2235/445; C04B 2235/447; C04B 2235/652; C04B 2235/6567; C04B 2235/6582; C04B 2235/6586; C04B 35/547; C01B 17/22;

(Continued)

(56) References Cited

U.S. PATENT DOCUMENTS 3,214,241 A * 10/1965 Forber .................... C03C 3/321
65/32.5
2013/0040208 A1 * 2/2013 Kanno .............. H01M 10/0562
429/321

(Continued)

FOREIGN PATENT DOCUMENTS

JP  2017-021965 A  1/2017
JP  2019-501105 A  1/2019

(Continued)

*Primary Examiner* — Aiqun Li
(74) *Attorney, Agent, or Firm* — Oliff PLC (57) ABSTRACT

A main object of the present disclosure is to provide a sulfide solid electrolyte with excellent water resistance. The present disclosure achieves the object by providing a sulfide solid electrolyte including a LGPS type crystal phase, and containing Li, Ge, P, and S, wherein: when an X-ray photoelectron spectroscopy measurement is conducted to a surface of the sulfide solid electrolyte, a proportion of $Ge^{2+}$ with respect to total amount of Ge is 20% or more.

14 Claims, 2 Drawing Sheets

(58) Field of Classification Search
CPC ........... C03C 4/14; C03C 10/00; C03C 3/321; C03C 3/16; C01G 17/006; Y02E 60/10
See application file for complete search history.

(56) References Cited

U.S. PATENT DOCUMENTS

| | | | |
|---|---|---|---|
| 2016/0064771 A1* | 3/2016 | Osaki | H01M 10/052 429/322 |
| 2018/0205116 A1 | 7/2018 | Kanno et al. | |
| 2018/0366779 A1 | 12/2018 | Katoh | |
| 2020/0020977 A1 | 1/2020 | Katori et al. | |
| 2020/0194825 A1 | 6/2020 | Katori et al. | |

FOREIGN PATENT DOCUMENTS

| | | |
|---|---|---|
| JP | 2020-027780 A | 2/2020 |
| JP | 2021-118038 A | 8/2021 |
| KR | 10-2017-0056338 A | 5/2017 |
| KR | 10-2019-0127851 A | 11/2019 |
| WO | 2018/173939 A1 | 9/2018 |
| WO | 2019/044517 A1 | 3/2019 |

\* cited by examiner

Sulfide solid electrolyte

SULFIDE SOLID ELECTROLYTE, ALL SOLID STATE BATTERY, AND METHOD FOR PRODUCING SULFIDE SOLID ELECTROLYTE

TECHNICAL FIELD

The present disclosure relates to a sulfide solid electrolyte.

BACKGROUND ART

An all solid state battery is a battery including a solid electrolyte layer between a cathode active material layer and an anode active material layer, and one of the advantages thereof is that the simplification of a safety device may be more easily achieved compared to a liquid-based battery including a liquid electrolyte containing a flammable organic solvent. As a solid electrolyte used for an all solid state battery, sulfide solid electrolytes have been known. Among sulfide solid electrolytes, a LGPS-based sulfide solid electrolyte has been known as a material with high Li ion conductivity.

For example, Patent Literature 1 discloses a method for producing a LGPS-based solid electrolyte, the method comprising a step of synthesizing a precursor by mixing a $Li_3PS_4$ crystal and a $Li_4MS_4$ crystal (M=Ge, Si, Sn) with the presence of the crystals, and a step of heat treating the precursor at 300 to 700° C. Also, Patent Literatures 2 to 4 respectively disclose a LGPS-based sulfide solid electrolyte.

CITATION LIST

Patent Literatures

Patent Literature 1: International Application Publication: WO 2018/173939
Patent Literature 2: Japanese Patent Application Laid-Open (JP-A) No. 2017-021965
Patent Literature 3: JP-A No. 2019-501105
Patent Literature 4: International Application Publication: WO 2019/044517

SUMMARY OF DISCLOSURE

Technical Problem

The LGPS-based sulfide solid electrolyte is a material with high Li ion conductivity; however, the Li ion conductivity will be degraded by water included in an atmosphere. For this reason, improvement in its water resistance has been desired. The present disclosure has been made in view of the above circumstances, and a main object thereof is to provide a sulfide solid electrolyte with excellent water resistance.

Solution to Problem

The present disclosure provides a sulfide solid electrolyte including a LGPS type crystal phase, and containing Li, Ge, P, and S, wherein: when an X-ray photoelectron spectroscopy measurement is conducted to a surface of the sulfide solid electrolyte, a proportion of $Ge^{2+}$ with respect to total amount of Ge is 20% or more.

According to the present disclosure, the proportion of $Ge^{2+}$ in the specified rate with respect to the total amount of Ge allows the sulfide solid electrolyte to have excellent water resistance.

In the disclosure, the proportion of the $Ge^{2+}$ may be 92% or less.
In the disclosure, the proportion of the $Ge^{2+}$ may be 49% or more.
In the disclosure, the proportion of the $Ge^{2+}$ may be 55% or more and 90% or less.
In the disclosure, the proportion of the $Ge^{2+}$ may be 94% or more.
In the disclosure, the proportion of the $Ge^{2+}$ may be 100%.

The present disclosure also provides an all solid state battery comprising a cathode active material layer, an anode active material layer, and a solid electrolyte layer arranged between the cathode active material layer and the anode active material layer, wherein at least one of the cathode active material layer, the anode active material layer, and the solid electrolyte layer contains the above described sulfide solid electrolyte.

According to the present disclosure, usage of the above described sulfide solid electrolyte allows the all solid state battery to maintain its output properties even under environment such as in high humidity.

The present disclosure also provides a method for producing the above described sulfide solid electrolyte, the method comprising: a preparing step of preparing a precursor containing Li, Ge, P, and S; and a firing step of firing the precursor under an atmosphere with gas containing at least one of a nitrogen gas and a noble gas to form the LGPS type crystal phase.

According to the present disclosure, the firing is performed in the specified gas atmosphere, and thus a sulfide solid electrolyte with excellent water resistance may be obtained.

In the disclosure, the gas may contain the nitrogen gas.
In the disclosure, the gas may contain an argon gas as the noble gas.
In the disclosure, the gas may contain an oxidative gas.
In the disclosure, the gas may contain a reductive gas.
In the disclosure, the firing step may comprise: a first firing treatment of firing the precursor under an atmosphere with a first gas containing an argon gas; and a second firing treatment of firing the precursor after the first firing treatment under an atmosphere with a second gas containing a nitrogen gas.
In the disclosure, the precursor may be a sulfide glass.

Advantageous Effects of Disclosure

The present disclosure exhibits an effect of providing a sulfide solid electrolyte with excellent water resistance.

DESCRIPTION OF EMBODIMENTS

The sulfide solid electrolyte, the all solid state battery, and the method for producing the sulfide solid electrolyte in the present disclosure will be hereinafter explained in details.

A. Sulfide Solid Electrolyte

The sulfide solid electrolyte in the present disclosure includes a LGPS type crystal phase, and contains Li, Ge, P, and S, wherein: when an X-ray photoelectron spectroscopy measurement is conducted to a surface of the sulfide solid electrolyte, a proportion of $Ge^{2+}$ with respect to total amount of Ge is 20% or more.

According to the present disclosure, the proportion of $Ge^{2+}$ in the specified rate with respect to the total amount of Ge allows the sulfide solid electrolyte to have excellent water resistance. The sulfide solid electrolyte including the LGPS type crystal phase is a material with high Li ion conductivity; however, the Li ion conductivity will be degraded by water included in an atmosphere. For this reason, improvement in its water resistance has been desired. In the present disclosure, the proportion of $Ge^{2+}$ with respect to the total amount of Ge is the specified rate, and thus the sulfide solid electrolyte may have excellent water resistance. Here, as described in Examples later, when a sulfide glass is fired in a vacuum, the Ge present in the surface of the particle will all be $Ge^{4+}$. In other words, the proportion of $Ge^{2+}$ (present rate of $Ge^{2+}$) with respect to the total amount of Ge will be 0%. In contrast, in the present disclosure, the proportion of $Ge^{2+}$ can be controlled by, for example, adjusting the kinds of gas to be used for firing. In specific, the gas used for firing will form a reductive layer ($Ge^{2+}$ layer) with high water resistance on the surface of the particle. By adjusting the kind of the gas, the rate of the reductive layer ($Ge^{2+}$ layer) can be controlled. In the present disclosure, the proportion of the $Ge^{2+}$ is set to the specified rate or more, and thus a sulfide solid electrolyte with excellent water resistance may be obtained. The reason why excellent water resistance is obtained thereby is presumably because the $Ge^{2+}$ has more excellent water resistance than that of the $Ge^{4+}$. This point is also suggested from the fact that the solubility of GeS to water is lower than that of $GeS_2$.

The sulfide solid electrolyte in the present disclosure contains Li, Ge, P and S. The total proportion of Li, Ge, P and S with respect to all the elements included in the sulfide solid electrolyte is, for example, 70 mol % or more, may be 80 mol % or more, and may be 90 mol % or more. Also, the sulfide solid electrolyte may or may not contain halogen. In the former case, the sulfide solid electrolyte may contain just one kind of the halogen, and may contain two kinds or more of the halogen. Examples of the halogen may include Cl, Br, and I.

The sulfide solid electrolyte in the present disclosure includes a LGPS-type crystal phase. In the present disclosure, the LGPS-type crystal phase refers to a crystal phase including Li, Ge, P and S. The LGPS-type crystal phase has typical peaks at the positions of $2\theta=20.18°\pm0.50°$, $20.44°\pm0.50°$, $26.96°\pm0.50°$, and $29.58°\pm0.50°$ in an X-ray diffraction measurement using a Cu-K$\alpha$ ray. Also, the LGPS-type crystal phase may include peaks at the positions of $2\theta=17.38°\pm0.50°$, $23.56°\pm0.50°$, $23.96°\pm0.50°$, $24.93°\pm0.50°$, $29.07°\pm0.50°$, $31.71°\pm0.50°$, $32.66°\pm0.50°$, and $33.39°\pm0.50°$. Incidentally, these peak positions may shift depending on factors such as the composition of the sulfide solid electrolyte, and thus the positions are specified in the range of $\pm0.50°$. The range of the positions of each peak may be $\pm0.30°$, and may be $\pm0.10°$.

Also, the LGPS-type crystal phase is usually a crystal phase including an octahedron O (such as $LiS_6$ octahedron) configured by a Li element and a S element, a tetrahedron $T_1$ (such as $GeS_4$ and $PS_4$) configured by a $M_{2a}$ element ($M_{2a}$ is at least one kind of P and Ge) and a S element, and a tetrahedron $T_2$ (such as $PS_4$) configured by a $M_{2b}$ element ($M_{2b}$ is at least one kind of P and Ge) and a S element, wherein the tetrahedron $T_1$ and the octahedron O share edges, and the tetrahedron $T_2$ and the octahedron O share the top.

The sulfide solid electrolyte in the present disclosure preferably includes the LGPS-type crystal phase as a main phase. "Including as a main phase" means that the proportion of the LGPS-type crystal phase is the largest with respect to all the crystal phases included in the sulfide solid electrolyte. The proportion of the LGPS-type crystal phase is, for example, 50 weight % or more, may be 70 weight % or more and may be 90 weight % or more. Incidentally, the proportion of the crystal phase can be measured by, for example, a radiation XRD.

Also, in the present disclosure, when an X-ray photoelectron spectroscopy measurement is conducted to a surface of the sulfide solid electrolyte, a proportion of $Ge^{2+}$ with respect to total amount of Ge is 20% or more. The proportion of $Ge^{2+}$ with respect to total amount of Ge may be 49% or more, may be 50% or more, may be 55% or more, and may be 60% or more. If the proportion of $Ge^{2+}$ with respect to total amount of Ge is too little, there is a possibility that the Li ion conductivity after the exposure to water may be degraded. Also, the proportion of $Ge^{2+}$ with respect to total amount of Ge may be 92% or less, may be 90% or less, and may be 85% or less. When the proportion of $Ge^{2+}$ is in the above described range, the Li ion conductivity after the exposure to water may be high. As described in Examples later, when the proportion of $Ge^{2+}$ with respect to total amount of Ge is 49% or more and 92% or less (preferably when 55% or more and 90% or less), the Li ion conductivity after the exposure to water may particularly be high. The method for calculating the proportion of $Ge^{2+}$ with respect to total amount of Ge will be described in Examples later.

Also, in the present disclosure, when an X-ray photoelectron spectroscopy measurement is conducted to a surface of the sulfide solid electrolyte, a proportion of $Ge^{2+}$ with respect to total amount of Ge may be 77% or more, may be 92% or more, may be 94% or more, may be 96% or more, and may be 100%. When the proportion of $Ge^{2+}$ is increased, the durability of the Li ion conductivity after the exposure to water may be high.

Also, in the present disclosure, when an X-ray photoelectron spectroscopy measurement is conducted to a surface of the sulfide solid electrolyte, a proportion of $Ge^{2+}$ with respect to total amount of Ge may be 45% or less. When the proportion of $Ge^{2+}$ is in the above described range, the Li ion conductivity after the exposure to water may be high.

There are no particular limitations on the composition of the sulfide solid electrolyte in the present disclosure. The sulfide solid electrolyte may have a composition represented by, for example, $\alpha LiX \cdot (1-\alpha)(Li_{4-x}Ge_{1-x}P_xS_4)$ provided that X is one kind or two kinds or more of halogen, $\alpha$ satisfies $0 \le \alpha < 1$, and x satisfies $0 < x < 1$. Examples of the X may include Cl, Br, and I. The a may be 0 and may be larger than 0. In the latter case, the a may be 0.1 or more and may be 0.2 or more. Meanwhile, the a may be 0.5 or less, and may be 0.4 or less. The x may be 0.5 or more, and may be 0.6 or more. Meanwhile, the x may be 0.8 or less, and may be 0.75 or less.

The sulfide solid electrolyte in the present disclosure preferably has high Li ion conductivity. The Li ion conductivity of the sulfide solid electrolyte at 25° C. is, for example, $1*10^{-4}$ S/cm or more, and may be $1*10^{-3}$ S/cm or more. Also, the sulfide solid electrolyte preferably has high Li ion conductivity after the specified exposure test. The Li ion conductivity at 25° C. after the exposure test is, for example, $1*10^{-4}$ S/cm or more, and may be $1*10^{-3}$ S/cm or more.

The exposure test is, as described in Examples later, a test in which the sulfide solid electrolyte is placed still for 6 hours in a glove box with the dew point controlled to −30° C. so that the sulfide solid electrolyte is exposed to water included in the atmosphere. When $IC_1$ designates the Li ion conductivity before the exposure test, and $IC_2$ designates the Li ion conductivity after the exposure test, $IC_2/IC_1$ (durability of the Li ion conductivity before and after the exposure test) is, for example, 27% or more, may be 56% or more, and may be 95% or more.

Examples of the shape of the sulfide solid electrolyte may include a granular shape. The average particle size ($D_{50}$) of the sulfide solid electrolyte is, for example, 0.1 μm or more, may be 0.5 μm or more, and may be 1 μm or more. Meanwhile, the average particle size ($D_{50}$) of the sulfide solid electrolyte is, for example, 50 μm or less, and may be 30 μm or less. The average particle size ($D_{50}$) may be obtained from, for example, the result of a particle distribution measurement by a laser diffraction scattering method.

The sulfide solid electrolyte in the present disclosure has excellent Li ion conductivity, and thus can be used in arbitrary applications that require the Li ion conductivity. Above all, the sulfide solid electrolyte is preferably used for an all solid state battery. Also, the method for producing the sulfide solid electrolyte in the present disclosure is not particularly limited, but examples thereof may include "C. Method for producing sulfide solid electrolyte" described later.

B. All Solid State Battery

Figure 1:
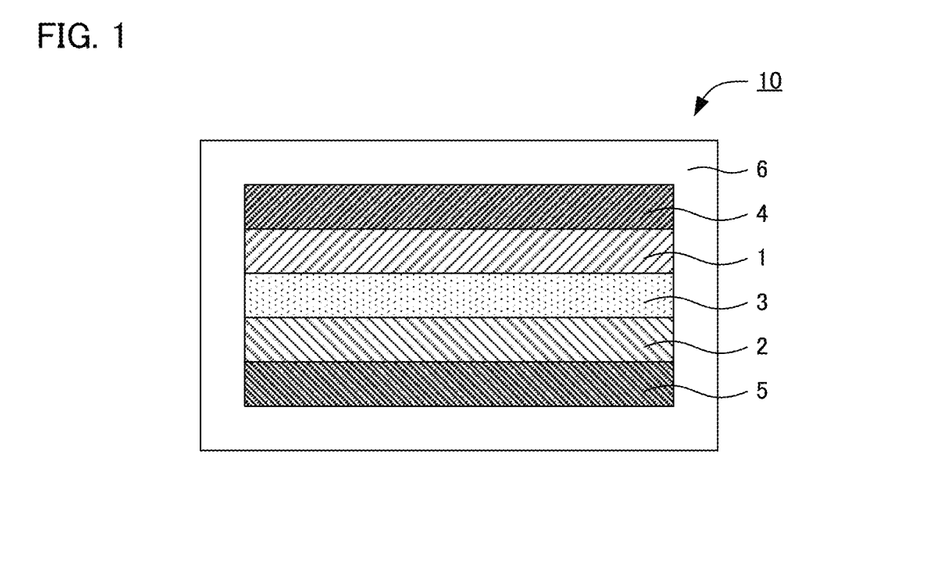
FIG. 1 is a schematic cross-sectional view exemplifying the all solid state battery in the present disclosure.

FIG. 1 is a schematic cross-sectional view exemplifying the all solid state battery in the present disclosure. All solid state battery 10 illustrated in FIG. 1 comprises cathode active material layer 1 containing a cathode active material, anode active material layer 2 containing an anode active material, solid electrolyte layer 3 arranged between the cathode active material layer 1 and the anode active material layer 2, cathode current collector 4 for collecting currents of cathode active material layer 1, anode current collector 5 for collecting currents of anode active material layer 2, and battery case 6 for storing these members. The present disclosure features that at least one of the cathode active material layer 1, the anode active material layer 2, and the solid electrolyte layer 3 contains the above described sulfide solid electrolyte.

According to the present disclosure, usage of the above described sulfide solid electrolyte allows the all solid state battery to maintain its output properties even under environment such as in high humidity.

1. Cathode Active Material Layer

The cathode active material layer is a layer containing at least a cathode active material, and may contain at least one of a solid electrolyte, a conductive material and a binder, as required. In particular, in the present disclosure, it is preferable that the cathode active material layer contains the above described sulfide solid electrolyte. The proportion of the sulfide solid electrolyte included in the cathode active material layer is, for example, 0.1 volume % or more, may be 1 volume % or more, and may be 10 volume % or more. Meanwhile, the proportion of the sulfide solid electrolyte included in the cathode active material layer is, for example, 80 volume % or less, may be 60 volume % or less, and may be 50 volume % or less. Also, examples of the cathode active material may include an oxide active material such as $LiCoO_2$, $LiMnO_2$, $LiNiO_2$, $LiNi_{1/3}Co_{1/3}Mn_{1/3}O_2$, $LiVO_2$, $LiCrO_2$, $Li_2NiMn_3O_8$, $LiFePO_4$, and $LiCoPO_4$.

The cathode active material layer may contain a conductive material. Addition of the conductive material improves the electron conductivity of the cathode active material layer. Examples of the conductive material may include a carbon material such as acetylene black, Ketjen black, and carbon fiber. Also, the cathode active material layer may contain a binder. Examples of the binder may include a fluorine-based binder such as polyvinylidene fluoride (PVDF). Also, the thickness of the cathode active material layer is, for example, 0.1 μm or more and 1000 μm or less.

2. Anode Active Material Layer

The anode active material layer is a layer containing at least an anode active material, and may contain at least one of a solid electrolyte, a conductive material and a binder, as required. In particular, in the present disclosure, it is preferable that the anode active material layer contains the above described sulfide solid electrolyte. The proportion of the sulfide solid electrolyte included in the anode active material layer is, for example, 0.1 volume % or more, may be 1 volume % or more, and may be 10 volume % or more. Meanwhile, the proportion of the sulfide solid electrolyte included in the anode active material layer is, for example, 80 volume % or less, may be 60 volume % or less, and may be 50 volume % or less. Also, examples of the anode active material may include a metal active material and a carbon active material. Examples of the metal active material may include In, Al, Si, and Sn. Meanwhile, examples of the carbon active material may include methocarbon microbeads (MCMB), highly oriented pyrolytic graphite (HOPG), hard carbon, and soft carbon.

Incidentally, the conductive material and the binder to be used in the anode active material layer are the same as those used in the above described cathode active material layer. Also, the thickness of the anode active material layer is, for example, 0.1 μm or more and 1000 μm or less.

3. Solid Electrolyte Layer

The solid electrolyte layer is a layer arranged between the cathode active material layer and the anode active material layer. Also, the solid electrolyte layer is a layer that contains at least a solid electrolyte, and may contain a binder as required. In particular, in the present disclosure, the solid electrolyte layer preferably contains the above described sulfide solid electrolyte. The proportion of the sulfide solid electrolyte included in the solid electrolyte layer is, for example, 50 volume % or more, may be 70 volume % or more, and may be 90 volume % or more. Incidentally, the binder to be used in the solid electrolyte layer is the same as that used in the above described cathode active material layer. Also, the thickness of the solid electrolyte layer is, for example, 0.1 μm or more and 1000 μm or less.

4. Other Constitutions

The all solid state battery in the present disclosure comprises at least the above described cathode active material layer, solid electrolyte layer and anode active material layer. Further, the battery usually comprises a cathode current collector for collecting currents of the cathode active material layer and an anode current collector for collecting currents of the anode active material layer. Examples of the material for the cathode current collector may include SUS, aluminum, nickel, iron, titanium and carbon. Meanwhile, examples of the material for the anode current collector may include SUS, copper, nickel, and carbon.

5. All Solid State Battery

The all solid state battery in the present disclosure is usually an all solid lithium ion battery. Also, the all solid state battery may be a primary battery and may be a secondary battery, but the latter is preferable. The reason therefor is to be repeatedly charged and discharged and useful as a car-mounted battery for example.

C. Method for Producing Sulfide Solid Electrolyte

Figure 2:
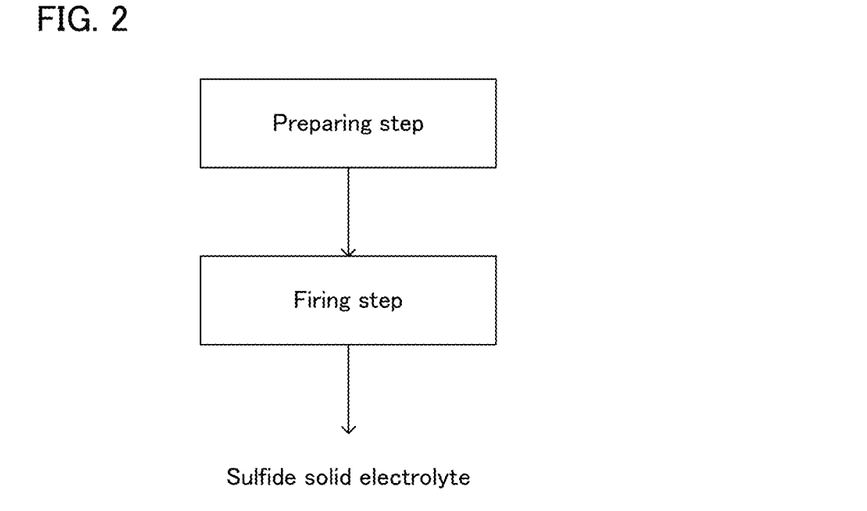
FIG. 2 is a flow chart exemplifying the method for producing the sulfide solid electrolyte in the present disclosure.

FIG. 2 is a flow-chart exemplifying the method for producing the sulfide solid electrolyte in the present disclosure. In FIG. 2, first, a precursor containing Li, Ge, P, and S is prepared (a preparing step). Next, the prepared precursor is fired under an atmosphere with gas containing at least one of a nitrogen gas and a noble gas to form the LGPS type crystal phase (a firing step). Thereby, the above described sulfide solid electrolyte is obtained.

According to the present disclosure, the firing is performed in the specified gas atmosphere, and thus a sulfide solid electrolyte with excellent water resistance may be obtained.

1. Preparing Step

The preparing step in the present disclosure is a step of preparing a precursor containing Li, Ge, P, and S. The precursor may be a raw material mixture, may be a sulfide glass, and may include the LGPS-type crystal phase.

First, the case where the precursor is a raw material mixture will be explained. The precursor usually contains a Li source, a Ge source, a P source, and a S source. Examples of the Li source may include a simple substance of Li and a lithium sulfide (such as $Li_2S$). Examples of the Ge source may include a simple substance of Ge and a germanium sulfide (such as $GeS_2$). Examples of the P source may include a simple substance of P and a phosphorus sulfide (such as $P_2S_5$). Examples of the S source may include a simple substance of S, a germanium sulfide and a phosphorus sulfide. Also, the raw material mixture may or may not contain LiX (X is a halogen).

There are no particular limitations on the composition of the raw material mixture. The raw material mixture may include a composition represented by, for example, $\alpha LiX \cdot (1-\alpha)(Li_{4-x}Ge_{1-x}P_xS_4)$ provided that X is one kind or two kinds or more of halogen, a satisfies $0 \leq \alpha < 1$, and x satisfies $0 < x < 1$. The X, the a and the x are in the same contents as those described in "A. Sulfide solid electrolyte" above. Also, the raw material mixture may be obtained by mixing each raw material by a mixing device (such as an agate mortar).

Next, the case where the precursor is a sulfide glass will be explained. The sulfide glass may be obtained by, for example, conducting mechanical milling to the raw material mixture. Examples of the mechanical milling may include ball milling, vibration milling, turbo milling, and disc milling. Also, the sulfide lass may be obtained by, for example, melting and quenching the raw material mixture. The sulfide glass usually includes amorphous properties. In other words, a halo pattern is observed in the sulfide glass in an X-ray diffraction measurement. In addition, the sulfide glass may or may not include a peak derived from the raw materials, but the latter is preferable. The reason therefore is to obtain higher amorphous properties.

Next, the case where the precursor includes the LGPS-type crystal phase will be explained. Such a precursor may be obtained by, for example, conducting a heat treatment to the raw material mixture or the sulfide glass. The heat treatment temperature is, for example, 300° C. or more, may be 400° C. or more, and may be 500° C. or more. Also, the heat treatment temperature is, for example, 1000° C. or less and may be 700° C. or less. Examples of the heat treatment atmosphere may include a reduced pressure atmosphere such as vacuum. The heat treatment time is, for example, 1 hour or more and 20 hours or less.

2. Firing Step

The firing step in the present disclosure is a step of firing the precursor under an atmosphere with gas containing at least one of a nitrogen gas and a noble gas to form the LGPS type crystal phase. In the present disclosure, the specified gas is used to reduce $Ge^{4+}$ in the surface of the particle to $Ge^{2+}$, and thereby a sulfide solid electrolyte with high proportion of $Ge^{2+}$ is obtained. Also, the proportion of $Ge^{2+}$ with respect to total amount of Ge may be adjusted by adjusting the composition of the gas used during the firing.

The gas (atmosphere gas) used during the firing contains at least one of a nitrogen gas and a noble gas. Examples of the noble gas may include an argon gas and a helium gas. The nitrogen gas has lower reduction power of reducing $Ge^{4+}$ to $Ge^{2+}$, compared to the noble gas. Incidentally, in the present disclosure, the nitrogen gas and the noble gas are referred to as a standard gas. The proportion of the standard gas in the atmosphere gas is, for example, 90 volume % or more, may be 95 volume % or more, and may be 99 volume % or more.

Also, the atmosphere gas may contain an oxidative gas. Addition of the oxidative gas may restrain the reduction power of the standard gas. Examples of the oxidative gas may include an oxygen gas, an oxygen-containing gas such as dry air, and a carbon dioxide gas. Also, the proportion of the oxidative gas in the atmosphere gas is, for example, 0.01 volume % or more and 1 volume % or less.

Also, the atmosphere gas may contain a reductive gas. Addition of the reductive gas may enhance the reduction power of the standard gas. Examples of the reductive gas may include a hydrocarbon gas such as a hydrogen gas, a carbon monoxide gas, methane, propane, and butane. Also, the proportion of the reductive gas in the atmosphere gas is, for example, 0.01 volume % or more and 1 volume % or less.

Also, in the present disclosure, it is preferable to flow the gas during the firing. The reason therefor is to facilitate the reduction of $Ge^{4+}$ in the particle surface to $Ge^{2+}$. The firing temperature is, for example, 300° C. or more, may be 400° C. or more, and may be 500° C. or more. Also, the firing temperature is, for example, 1000° C. or less, and may be 700° C. or less. The firing time is, for example, 1 hour or more and 20 hours or less.

Also, in the present disclosure, the firing step may include: a first firing treatment of firing the precursor under an atmosphere with a first gas containing an argon gas; and a second firing treatment of firing the precursor after the first firing treatment under an atmosphere with a second gas containing a nitrogen gas. By performing the first firing treatment and the second firing treatment, a sulfide solid electrolyte with high Li ion conductivity after the exposure test and also with high durability before and after the exposure test may be obtained. The first firing treatment and the second firing treatment may be performed continuously, and cooling may be performed after the first firing treatment and then the second firing treatment may be performed thereafter. In the latter case, cooling may be performed until the room temperature after the first firing treatment. Also, the firing temperature and the firing time in the first firing treatment and the second firing treatment are respectively in the same contents as those described above.

3. Sulfide Solid Electrolyte

The sulfide solid electrolyte obtained by each step described above is in the same contents as those described in "A. Sulfide solid electrolyte" above; thus, the descriptions herein are omitted.

The present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Comparative Example 1

As raw materials, $Li_2S$, $P_2S_5$ and $GeS_2$ were prepared, and these were weighed to have the composition of $Li_{10}GeP_2Si_2$, and the product was put in a zirconium pot together with zirconium balls. After that, mechanical milling (mechanical alloying) was conducted thereto in the conditions of 380 rpm and 40 hours by a planetary ball mill, and thereby a sulfide glass was obtained. The obtained sulfide glass was formed into pellet, vacuum-sealed in a quartz tube, fired in the conditions of 550° C. and 8 hours, and thereby a sulfide solid electrolyte was obtained.

Example 1

A sulfide glass was obtained in the same manner as in Comparative Example 1. The obtained sulfide glass was placed on an alumina board, and with a tube furnace, firing was performed thereto in the conditions of 550° C. and 8 hours while flowing a gas in which 0.2 volume % of an oxygen gas was added to a nitrogen gas, and thereby a sulfide solid electrolyte was obtained.

Example 2

A sulfide glass was obtained in the same manner as in Comparative Example 1. The obtained sulfide glass was placed on an alumina board, and with a tube furnace, firing was performed thereto in the conditions of 550° C. and 8 hours while flowing a nitrogen gas, and thereby a sulfide solid electrolyte was obtained.

Example 3

A sulfide glass was obtained in the same manner as in Comparative Example 1. The obtained sulfide glass was placed on an alumina board, and with a tube furnace, firing was performed thereto in the conditions of 550° C. and 8 hours while flowing an argon gas. The product was cooled until the room temperature, and then again, with a tube furnace, firing was performed thereto in the conditions of 550° C. and 8 hours while flowing a nitrogen gas, and thereby a sulfide solid electrolyte was obtained.

Example 4

A sulfide glass was obtained in the same manner as in Comparative Example 1. The obtained sulfide glass was placed on an alumina board, and with a tube furnace, firing was performed thereto in the conditions of 550° C. and 8 hours while flowing an argon gas, and thereby a sulfide solid electrolyte was obtained.

Example 5

A sulfide glass was obtained in the same manner as in Comparative Example 1. The obtained sulfide glass was placed on an alumina board, and with a tube furnace, firing was performed thereto in the conditions of 550° C. and 8 hours while flowing a gas in which 0.2 volume % of a hydrogen gas was added to an argon gas, and thereby a sulfide solid electrolyte was obtained.

[Evaluation]

<XRD Measurement>

An X-ray diffraction (XRD) measurement was respectively conducted to the sulfide solid electrolytes obtained in Examples 1 to 5 and Comparative Example 1. As a result, it was confirmed that all the sulfide solid electrolytes obtained in Examples 1 to 5 and Comparative Example 1 had the LGPS-type crystal phase.

<XPS Measurement>

An X-ray photoelectron spectroscopy (XPS) measurement was respectively conducted to the sulfide solid electrolytes obtained in Examples 1 to 5 and Comparative Example 1, and thereby the structures of the sulfide solid electrolytes were evaluated. As the measurement device for the X-ray photoelectron spectroscopy, an XPS device PHI-5800 from ULVAC-PHI, INCORPORATED was used. A sample was put in a holder for the XPS measurement in a glove box with an argon atmosphere, the holder was vacuumed for 30 minutes or more in a preliminary exhaust room, and then introduced to a chemical laboratory. In the measurement, an X-ray source of monochromatic AlKα (1487 eV) was used, and the information of the outermost surface of the sample was obtained. The measurement area was approximately 100 μm, and a neutralization gun of $Ar^+$ electron beam was used for neutralizing charges.

Figure 3:
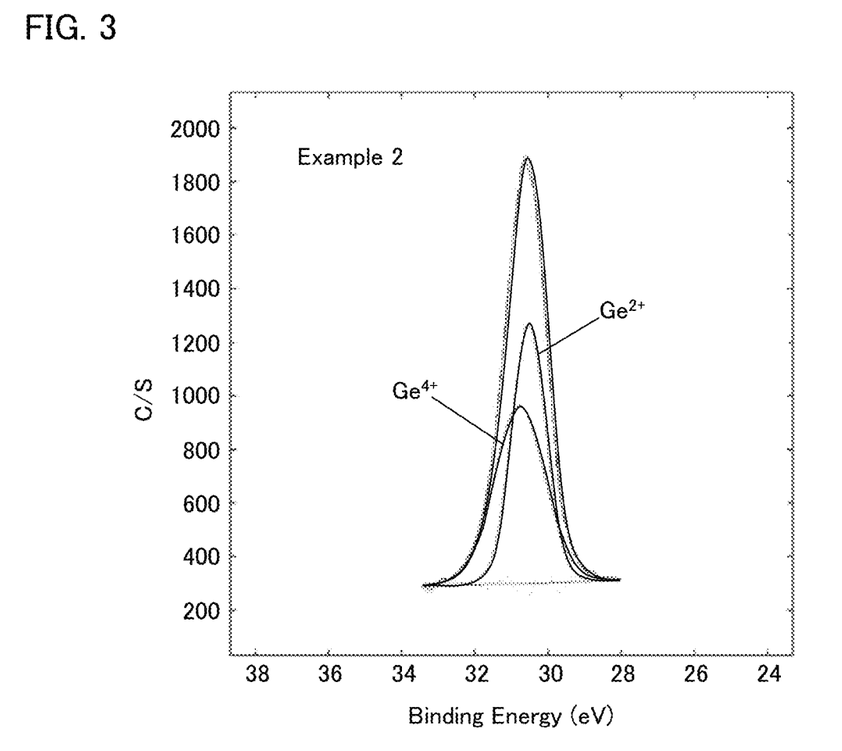
FIG. 3 is the result of an XPS measurement to the sulfide solid electrolyte produced in Example 2.

Peak resolution of Ge3d spectrum obtained by the XPS measurement was conducted, and the peak area A of $Ge^{4+}$ corresponding to high energy, and the peak area B of $Ge^{2+}$ corresponding to low energy were calculated. With the calculated peak areas, the present rate of $Ge^{2+}$ (B/(A+B)) was obtained, and signified as "the proportion of $Ge^{2+}$ with respect to total amount of Ge". The peak resolution was conducted by an analyzing software (MULTI PACK from ULVAC-PHI, INCORPORATED) attached to the measurement device of the X-ray photoelectron spectroscopy. The background processing was performed by Shirley method, and curve fitting by a nonlinear least square method was used for the peak resolution. As a typical result, the result of Example 2 is shown in FIG. 3. In specific, as shown in FIG. 3, Ge3d spectrum obtained by the XPS measurement separated into the peak of $Ge^{4+}$ and the peak of $Ge^{2+}$, and the present rate of $Ge^{2+}$ was obtained from each of the peak area. The results are shown in Table 1.

<Li Ion Conductivity Measurement>

A Li-ion conductivity measurement was respectively conducted to the sulfide solid state electrolytes obtained in Examples 1 to 5 and Comparative Example 1. In specific, the sulfide solid electrolyte was weighted to be 100 mg, in a glove box with a dew point of −80° C., put in a cylinder made of macole, and pressed by the pressure of 4 ton/cm². Both edges of the obtained pellet were pinched by a pin made of SUS, restraining pressure was applied to the pellet by bolting, and thereby an evaluation cell was obtained. The Li ion conductivity at 25° C. of the evaluation cell was calculated by A.C. impedance method. In the measurement, Solartron 1260 was used with applied voltage: 5 mV and measurement frequency range: 0.01 MHz to 1 MHz. The results (Li ion conductivity before the exposure test) are shown in Table 1.

<Exposure Test>

Figure 4:
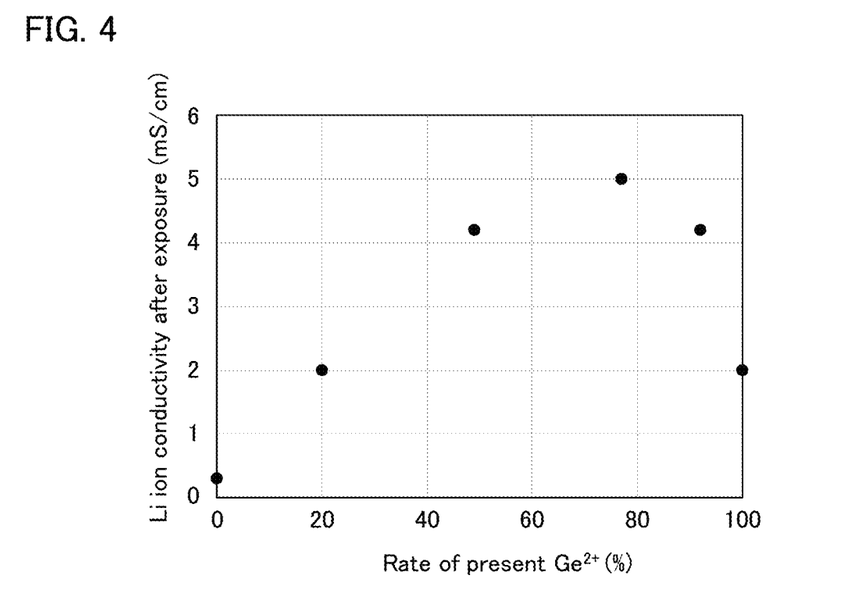
FIG. 4 is a graph showing the relation between the present rate of $Ge^{2+}$ and the Li ion conductivity after the exposure test.

An exposure test was respectively conducted to the sulfide solid state electrolytes obtained in Examples 1 to 5 and Comparative Example 1. In specific, the sulfide solid electrolyte was placed still for 6 hours in a glove box of which dew point is controlled to −30° C., and thereby the sulfide solid electrolyte was exposed to water included in the atmosphere. The Li ion conductivity after the exposure test was calculated in the same manner as above. The results are shown in Table 1 and FIG. 4.

TABLE 1

| | $Ge^{2+}$ | Li ion conductivity | | | |
| --- | --- | --- | --- | --- | --- |
| | Present rate (%) | Before exposure (mS/cm) | After exposure (mS/cm) | Durability (%) | Firing atmosphere |
| Comp. Ex. 1 | 0 | 8.0 | 0.3 | 3.8 | Vacuum |
| Example 1 | 20 | 7.3 | 2.0 | 27.4 | $N_2 + O_2$ |
| Example 2 | 49 | 7.5 | 4.2 | 56.0 | $N_2$ |
| Example 3 | 77 | 5.2 | 5.0 | 96.2 | $Ar \rightarrow N_2$ |
| Example 4 | 92 | 4.3 | 4.2 | 97.7 | Ar |
| Example 5 | 100 | 2.1 | 2.0 | 95.2 | $Ar + H_2$ |

As shown in Table 1, when firing was performed in vacuum as in Comparative Example 1, the present rate of $Ge^{2+}$ was 0%. In other words, all Ge present in the particle surface of the sulfide solid electrolyte was $Ge^{4+}$. In contrast, the present rate of $Ge^{2+}$ in Examples 1 to 5 was respectively 20% or more. Also, as shown in Table 1 and FIG. 4, the Li ion conductivity after the exposure test of Examples 1 to 5 was respectively higher than that of Comparative Example 1. Among them, the Li ion conductivity after the exposure test was high in Examples 2 to 4, and in particular, that of Example 3 was the highest. In other words, it was suggested that the maximum value exists between Example 2 and Example 4.

Also, from the viewpoint of the durability of the Li ion conductivity before and after the exposure test, the durability of Example 2 was higher than that of Example 1, and the durability of Examples 3 to 5 was respectively remarkably higher than that of Example 2. Also, when Examples 3 and 4 are compared to Example 5, the Li ion conductivity after the exposure test of Examples 3 and 4 was respectively higher than that of Example 5, and the durability of the Li ion conductivity before and after the exposure test was equivalent in Examples 3 to 5. Also, from the results of Examples 1 to 5 and Comparative Example 1, it is clear that the present rate of $Ge^{2+}$ gives an effect to the water resistance of the sulfide solid electrolyte. For this reason, from the viewpoint of water resistance over time, it was suggested that Example 5 was superior.

Also, the results of Examples 1 to 5 will be considered in details. First, when Example 2 is compared to Example 4, it was confirmed that the reduction power of reducing $Ge^{4+}$ to $Ge^{2+}$ of nitrogen gas was weaker than that of argon gas. The nitrogen gas and the argon gas has been generally known as gas with low reactivity, but there was surprisingly large difference in the present rate of $Ge^{2+}$ between when the nitrogen gas was used and when the argon gas was used. The reason for the large difference is not completely clear, but there is a possibility that the reactivity of the nitrogen was lower than that of the argon gas, since the nitrogen gas itself is categorized as a neutralization gas. Also, since sulfur included in the precursor is presumably volatilized during firing, some kind of interaction occurs among the sulfur volatilized, the nitrogen gas and the argon gas, and there is also a possibility that the large difference occurred due to the strength and weakness of that interaction.

Next, when Example 2 is compared to Example 1, it was confirmed that the reduction power of reducing $Ge^{4+}$ to $Ge^{2+}$ was restrained when the oxygen gas that was an oxidative gas was added to the nitrogen gas. Similarly, when Example 4 is compared to Example 5, it was confirmed that the reduction power of reducing $Ge^{4+}$ to $Ge^{2+}$ was enhanced when the hydrogen gas that was a reductive gas was added to the argon gas. In this manner, it was confirmed that the present rate of $Ge^{2+}$ was controlled when the oxidative gas and the reductive gas were used. Also, although an experiment was not conducted in particular, when an oxidative gas is added to the argon gas, it is expected that the present rate of $Ge^{2+}$ would be in the same level as that of Example 3. Similarly, when a reductive gas is added to the nitrogen gas, it is expected that the present rate of $Ge^{2+}$ would be in the same level as that of Example 3.

Next, in Example 3, the first firing treatment in which the argon gas was flowed, and the second firing treatment in which the nitrogen gas was flowed were performed. In the stage when the first firing treatment was completed, the present rate of $Ge^{2+}$ is presumably 92% similarly to that of Example 4, but after the performance of the second firing treatment, the present rate of $Ge^{2+}$ was reduced to 77%. The reason therefor is not clear, but it is presumed that there was a possibility the amount of $Ge^{4+}$ dispersed from inside the particles was more than the amount of $Ge^{4+}$ reduced to $Ge^{2+}$ by the nitrogen gas.

REFERENCE SIGNS LIST 1 cathode active material layer
2 anode active material layer
3 solid electrolyte layer
4 cathode current collector
5 anode current collector
6 battery case
10 all solid state battery

What is claimed is:

1. A sulfide solid electrolyte comprising a LGPS type crystal phase, and containing Li, Ge, P, and S, wherein:
when an X-ray photoelectron spectroscopy measurement is conducted to a surface of the sulfide solid electrolyte, a proportion of $Ge^{2+}$ with respect to total amount of Ge is 20% or more.

2. The sulfide solid electrolyte according to claim 1, wherein the proportion of the $Ge^{2+}$ is 92% or less.

3. The sulfide solid electrolyte according to claim 1, wherein the proportion of the $Ge^{2+}$ is 49% or more.

4. The sulfide solid electrolyte according to claim 1, wherein the proportion of the $Ge^{2+}$ is 55% or more and 90% or less.

5. The sulfide solid electrolyte according to claim 1, wherein the proportion of the $Ge^{2+}$ is 94% or more.

6. The sulfide solid electrolyte according to claim 1, wherein the proportion of the $Ge^{2+}$ is 100%.

7. An all solid state battery comprising a cathode active material layer, an anode active material layer, and a solid electrolyte layer arranged between the cathode active material layer and the anode active material layer, wherein:
at least one of the cathode active material layer, the anode active material layer, and the solid electrolyte layer contains the sulfide solid electrolyte according to claim 1.

8. A method for producing the sulfide solid electrolyte according to claim 1, the method comprising:
a preparing step of preparing a precursor containing Li, Ge, P, and S; and a firing step of firing the precursor under an atmosphere with gas containing at least one of a nitrogen gas and a noble gas to form the LGPS type crystal phase.

9. The method for producing the sulfide solid electrolyte according to claim 8, wherein the gas contains the nitrogen gas.

10. The method for producing the sulfide solid electrolyte according to claim 8, wherein the gas contains an argon gas as the noble gas.

11. The method for producing the sulfide solid electrolyte according to claim 8, wherein the gas further contains an oxidative gas.

12. The method for producing the sulfide solid electrolyte according to claim 8, wherein the gas further contains a reductive gas.

13. The method for producing the sulfide solid electrolyte according to claim 8, wherein the firing step comprises:
a first firing treatment of firing the precursor under an atmosphere with a first gas containing an argon gas; and
a second firing treatment of firing the precursor after the first firing treatment under an atmosphere with a second gas containing a nitrogen gas.

14. The method for producing the sulfide solid electrolyte according to claim 8, wherein the precursor is a sulfide glass.

* * * * *